United States Patent [19]

MacLennan

[11] Patent Number: 5,303,752
[45] Date of Patent: Apr. 19, 1994

[54] SAW TOOTH HOLDER

[75] Inventor: Charles D. MacLennan, Hudson Heights, Canada

[73] Assignee: Quadco Equipment Inc., St-Eustache, Canada

[21] Appl. No.: 50,642

[22] Filed: Apr. 22, 1993

[51] Int. Cl.⁵ .................. A01G 23/08; B27B 33/08
[52] U.S. Cl. .................. 144/34 R; 144/3 D; 144/336; 83/840
[58] Field of Search .................. 83/835, 840, 841, 842, 83/843, 844; 144/3 D, 34 R, 241, 336; 407/33, 47, 51; 56/255, 295, DIG. 17

[56] References Cited

U.S. PATENT DOCUMENTS

| | | | |
|---|---|---|---|
| 1,653,265 | 12/1927 | Foerster | 83/840 |
| 5,085,112 | 2/1992 | MacLennan | 83/840 |
| 5,113,919 | 5/1992 | MacLennan | 144/34 R |
| 5,131,305 | 7/1992 | MacLennan | 83/840 |

*Primary Examiner*—Eugenia Jones
*Attorney, Agent, or Firm*—Samuel Meerkreebs

[57] ABSTRACT

A cutting tooth holder for circular saws used on felling heads. A plurality of the holders are mounted on a circular saw disk about its rim. Each holder has a clevis shape with the leg of the holder that is on top of the saw disk being relatively short compared to the length of the leg on the bottom of the saw. The short upper legs of the holders permit the use of a larger butt plate on the felling head to cover the saw.

2 Claims, 2 Drawing Sheets

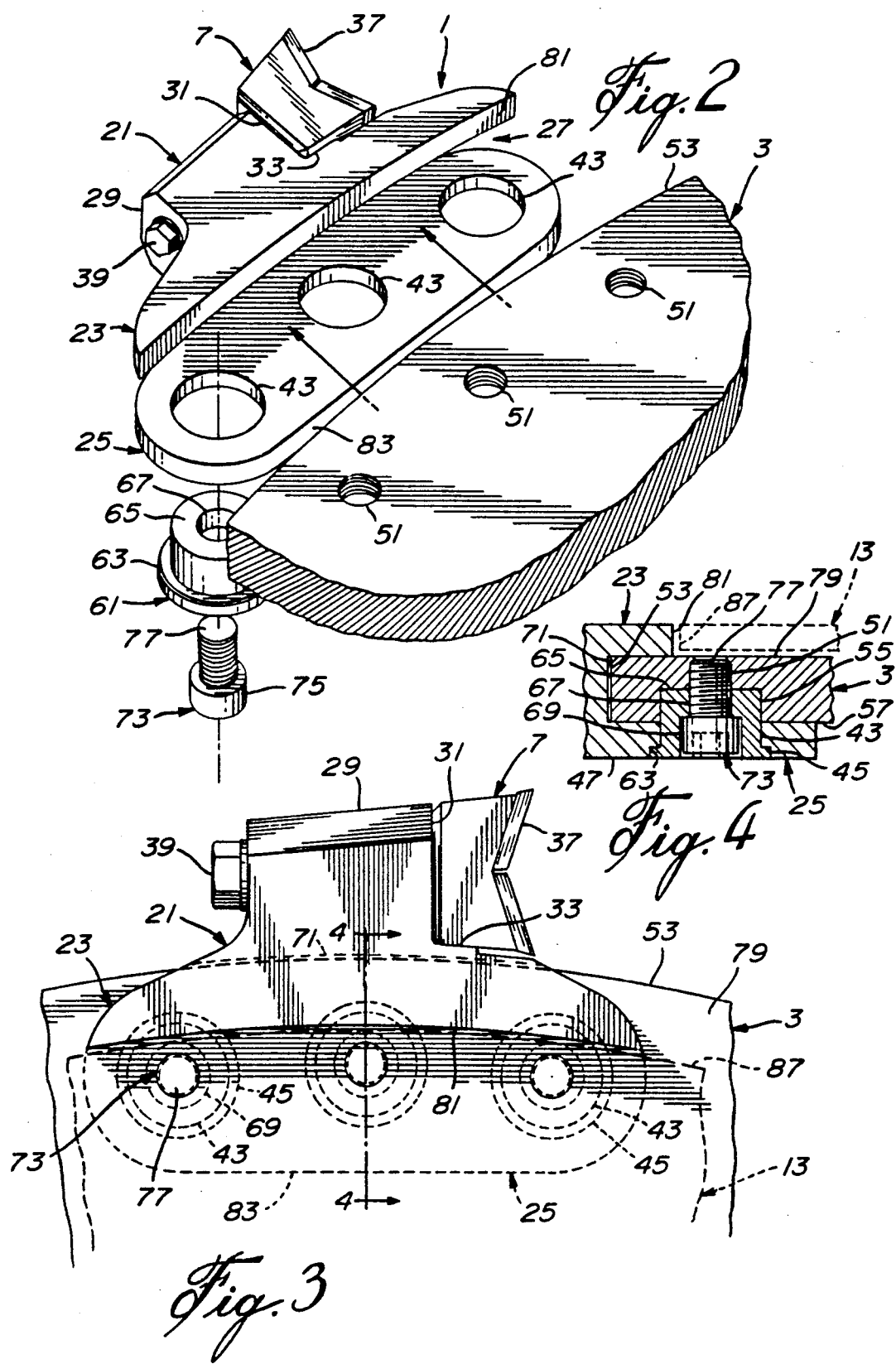

SAW TOOTH HOLDER

BACKGROUND OF THE INVENTION

1. Field of the Invention

This invention is directed toward an improved cutting tooth holder for a circular saw.

The invention is also directed toward an improved circular saw incorporating the improved cutting tooth holders.

The invention is further directed toward a feller head incorporating the improved circular saw.

2. Description of the Prior Art

Circular saws, having cutting teeth mounted on the periphery of a circular saw disk, are now commonly used on feller heads for felling trees. The saw is mounted at the bottom of the felling head and is rotated in a generally horizontal plane. The felling head is moved horizontally to have the rotating saw cut through a standing tree. The felling head often carries a fixed, generally horizontal butt plate that lies closely adjacent to the upper surface of the saw. The cutting teeth of the circular saw cut a wide enough kerf in the tree being felled that allows both the saw disk and butt plate to freely enter the kerf. When the tree is cut through, it drops onto the butt plate. Arms on the felling head can hold the cut tree upright on the butt plate while another tree is cut or while the felling head is moved to transport the cut tree to another station for further processing.

The cutting teeth of the circular saw can be mounted on the saw disk in various ways. One preferred way of mounting the cutting teeth is to use clevis-shaped tooth holders as shown in U.S. Pat. No. 5,058,477, issued to Charles MacLennan on Oct. 22, 1991. Each holder usually holds one tooth and comprises a body portion having a pair of dependent legs. The holder is mounted over the edge of the circular disk with the legs straddling the disk. A peripheral edge portion of the disk snugly enters the slot between the legs of the holder. Bolts passing through the legs and disk securely connect the holder to the disk. The cutting tooth is mounted adjacent one end of the body portion just outside the peripheral edge of the disk with its cutting edges facing in the direction of rotation of the saw.

The holders described above work quite satisfactorily. However, because the legs of the holders extend radially inwardly some distance over the saw disk, they limit the size of the butt plate that can be used. The outer edge of the butt plate, to clear the inner ends of the legs of the tooth holders, must be spaced inwardly some distance from the rim of the saw disk. Thus, a fairly wide peripheral portion of the saw disk is left uncovered by the butt plate. This uncovered portion of the rotating disk may catch the butt of the tree just as it is cut through and drops and flip it off the felling head.

SUMMARY OF THE INVENTION

It is the purpose of the present invention to provide an improved saw tooth holder for circular saws that allows the butt plate to cover more of the saw disk, extending closer to its rim, than present holders allow.

In accordance with the present invention, the improved holder has its upper leg cut back so that its free edge is close to the rim of the saw disk. This allows the butt plate to be enlarged so that it now lies closely adjacent to the rim of the saw disk thereby covering a larger part of the saw disk and minimizing the chance of flipping of a cut tree by the rotating saw. With the upper leg cut back, the holder is fastened to the disk by bolts which pass through the lower leg of the holder into the disk. The bolts do not project past the upper surface of the disk.

The invention is particularly directed toward a saw tooth holder for a circular saw having a body portion and a pair of legs depending from one side of the body portion. The legs are parallel and define a slot between them for snugly receiving a peripheral portion of a circular saw disk. One of the legs is much longer than the other leg. The long leg has at least two transverse through holes through which bolts, used to fasten the holder to a circular saw disk, can pass.

The invention is also particularly directed toward a circular saw having a circular saw disk and a plurality of saw tooth holders mounted on the disk at spaced-apart locations on its periphery. At least one saw tooth is mounted on each holder. Each holder has a body portion and a pair of legs depending from one side of the body portion. The legs are parallel and define a slot between them for snugly receiving a peripheral portion of the circular saw disk. One of the legs is much longer than the other leg. The longer leg has at least two transverse through holes. The holes in the long leg of each holder are aligned with corresponding holes in the circular saw disk. Bolts pass through the holes in each holder into the holes in the disk to securely connect each holder to the disk. All the long legs of the holders are on the same side of the disk.

BRIEF DESCRIPTION OF THE DRAWINGS

The invention will now be described in detail having reference to the accompanying drawings, in which:

FIG. 2 is an exploded detail view of the tooth holder assembly;

FIG. 3 is a detail plan view showing a holder mounted on a saw disk; and

FIG. 4 is a cross-section view taken along line 4—4 in FIG. 3.

DESCRIPTION OF THE PREFERRED EMBODIMENTS

Figure 1:
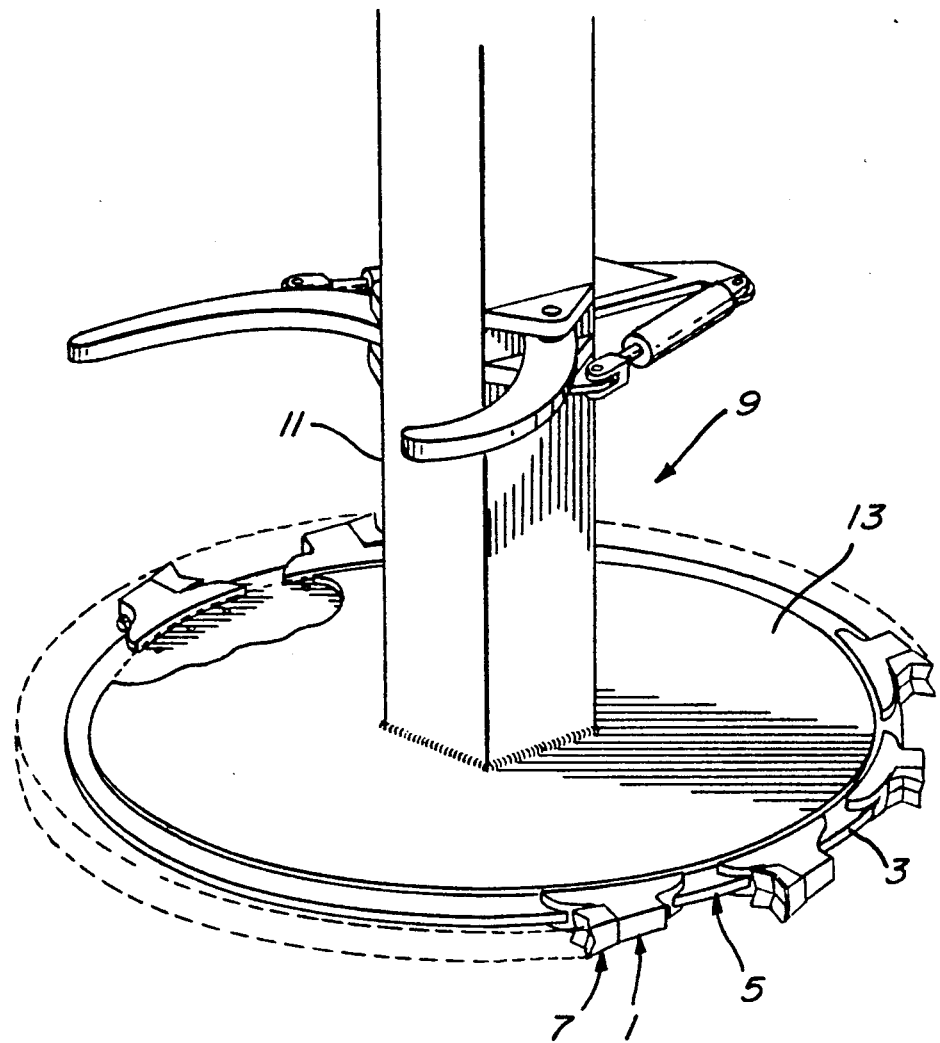
FIG. 1 is a perspective view of a feller head.

The saw tooth holder 1 of the present invention is mounted on the rim of a circular saw disk 3 of a circular saw 5, as shown in FIG. 1. A plurality of the holders 1 are mounted in spaced-apart relationship about the rim of the disk 3. Each holder 1 carries at least one cutting tooth 7. The circular saw 5 is normally used on a feller head 9 for felling trees. The feller head 9 has a vertical support 11, and the saw 5 is mounted beneath this support 11 for rotation about a vertical axis. A butt plate 13, fixed to the support 11, covers nearly all of the upper surface of the saw.

In more detail, as shown in FIGS. 2 to 4, each saw tooth holder 1 has a body 21 with a pair of legs 23, 25 extending from one side of the body 21. The legs 23, 25 are parallel and define a slot 27 between them into which the peripheral edge of a circular saw disk 3 fits. One of the legs 23 is much shorter than the other leg 25. The body 21 has a block-like portion 29 extending in an opposite direction to the legs 23, 25. The block portion 29 is not nearly as wide as the legs 23, 25. One end 31 of the block portion defines a stop shoulder. A locating surface 33 is formed on the body 21 adjacent the stop shoulder 31 and generally transverse to it. A cutting tooth 7 is mounted on the holder 1 with its cutting edges 37 facing away from the stop shoulder 31. The tooth 7 rests against both the stop shoulder 31 and locating surface 33. A bolt 39 passes through the block portion 29 into the tooth 7 to securely fasten it against the stop shoulder 31.

The longer leg 25 of the tooth holder 1 has at least two and preferably three spaced-apart, fastening holes 43 in it. Each fastening hole 43 has a counterbore 45 on the outer surface 47 of the leg 25. Corresponding fastening holes 51 are provided for each holder 1 in the saw disk 3 near its rim 53. Each fastening hole 51 has a counterbore 55 on the bottom surface 57 of the saw disk 3. The fastening hole 51 is threaded. The counterbore 55 has the same diameter as the fastening hole 43 in the leg of the holder. A fastening sleeve 61 is provided for each fastening hole 43. The sleeve 61 has a flange 63 at one end and a bottom wall 65 at the other end. A through hole 67 is provided in the bottom wall 65, equal in diameter to the fastening hole 51 in the saw disk 3. The hole 67 has a counterbore 69.

The holder 1 is mounted over the edge 53 of the saw disk 3, its legs 23, 25 straddling the disk, and its fastening holes 43 aligned with the fastening holes 51 in the saw disk 3. The long leg 25 is adjacent the bottom surface 57 of the disk 3, and the edge 53 of the disk 3 abuts the bottom edge 71 of the slot 27 in the holder. A fastening sleeve 61 is inserted into each aligned fastening hole 43, 51 pair, the flange 63 of the sleeve 61 snug in the counterbore 45 of fastening hole 43. A bolt 73 is inserted through the hole 67 in the sleeve 61 and tightly threaded in the threaded hole 51 in the disk 3. The head 75 of the bolt 73 is recessed in the counterbore 69 in the sleeve 61. The bolts 73 securely fasten each holder 1 to the saw disk 3.

It will be seen in FIG. 4 that the end 77 of the bolt 73 does not extend past the upper surface 79 of the disk 3. With the holders 1 bolted in place, the curved inner edges 81 of the short legs 23, which short legs are adjacent the upper surface 79 of the disk 3, are relatively close to the peripheral edge 53 of the disk 3, as compared to how close the inner edges 83 of the long legs 25 are. The inner edges 81 of the short legs 23 have the same center of curvature as the disk 3.

When the saw 5 is now mounted on the feller head 7, the butt plate 13 is made large enough to substantially cover the upper surface 79 of the saw disk 3. The peripheral edge 87 of the butt plate 13 lies closely adjacent to the curved inner edges 81 of the short legs 23 of the holders 1. Very little of the saw disk 3 now extends past the peripheral edge 87 of the butt plate 13, thus minimizing the chance of having the rotating disk move cut trees off the butt plate 13.

I claim:

1. A felling head having a main, vertical support having a bottom; a circular saw mounted at the bottom of the support for rotation about a vertical axis; the circular saw having a circular saw disk, a plurality of saw tooth holders mounted on the disk at spaced-apart locations on its periphery, at least one saw tooth mounted on each holder; each holder having a body portion and a pair of plate-like legs depending from one side of the body portion, the legs being parallel and defining a slot between them for snugly receiving a peripheral portion of the circular saw disk, one of the legs being longer than the other leg, the longer leg having at least two transverse through holes; the holes in the longer leg of each holder being aligned with corresponding the holes in the circular saw disk; bolts passing through the holes in each holder into the holes in the disk to securely connect the holders to the disk, each of the longer legs of the respective holders being adjacent a bottom surface of the disk; and a circular butt plate fixed to the support and lying closely adjacent to a top surface of the disk, the butt plate having a radius less than the radius of the saw disk and the shorter legs of the holders each having an edge defining an arc having a radius matching the radius of the butt plate, such that the arcuate edge of the shorter leg is in close proximity to the butt plate periphery and the shorter leg and butt plate are in the same plane above the disk.

2. A felling head as defined in claim 1, wherein the holes in the saw disk are threaded, and the bolts have lengths such that, when tightened, the ends of the bolts are located within the disk holes.

* * * * *